(12) United States Patent
Nozaki (10) Patent No.: US 7,055,285 B2
(45) Date of Patent: Jun. 6, 2006

(54) TRIM AND GLASS RUN ATTACHMENT STRUCTURE IN VEHICLE DOOR

(75) Inventor: Masahiro Nozaki, Nishikasugai-gun (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 09/785,461

(22) Filed: Feb. 20, 2001

(65) Prior Publication Data

US 2001/0015035 A1    Aug. 23, 2001

(30) Foreign Application Priority Data

Feb. 21, 2000  (JP)  ............ P. 2000-043189

(51) Int. Cl.
*E06B 7/16* (2006.01)
(52) U.S. Cl. ............ 49/479.1; 49/440; 49/489.1
(58) Field of Classification Search ............ 49/440, 49/489.1, 490.1, 484.1, 479.1
See application file for complete search history.

(56) References Cited

U.S. PATENT DOCUMENTS

| | | | |
|---|---|---|---|
| 2,899,720 A * | 8/1959 | Vollmer ............ | 49/479.1 |
| 5,168,668 A | 12/1992 | Mishima et al. | |
| 5,702,148 A * | 12/1997 | Vaughan et al. ...... | 296/146.9 |
| 5,852,898 A * | 12/1998 | Hikosaka et al. ...... | 49/489.1 |
| 6,082,048 A * | 7/2000 | Backes et al. ............ | 49/377 |
| 6,240,677 B1 * | 6/2001 | Baumann .............. | 49/479.1 |
| 6,279,987 B1 * | 8/2001 | Keeney et al. .......... | 296/146.9 |
| 6,370,824 B1 * | 4/2002 | Keeney et al. ............ | 49/441 |

FOREIGN PATENT DOCUMENTS

| | | |
|---|---|---|
| EP | 0 341 136 A1 | 11/1989 |
| EP | 0 668 178 A1 | 8/1995 |
| GB | 2 312 460 A | 10/1997 |
| JP | 4-130514 | 11/1992 |
| JP | 10-086668 | 4/1998 |

OTHER PUBLICATIONS

UK Search Report dated May 18, 2001.

* cited by examiner

*Primary Examiner*—Gregory J. Strimbu
(74) *Attorney, Agent, or Firm*—Posz Law Group, PLC (57) ABSTRACT

A window frame is constituted by an inner panel, an outer panel and a door sash which are formed by press molding, and a glass run body of a glass run is attached and locked in an attachment groove provided in the door sash. A trim formed separately from the glass run is attached to an interior flange of the inner panel and an interior flange of the door sash so that an exterior holding lip of the trim is brought into pressure contact with an interior holding lip provided on the glass run. A door glass is adapted to be guided to slide by seal lips of the glass run. The interior flange of the door sash and the attachment groove are integrally formed as a single component and the relative positions of these two parts are kept stable.

15 Claims, 7 Drawing Sheets

TRIM AND GLASS RUN ATTACHMENT STRUCTURE IN VEHICLE DOOR

BACKGROUND OF THE INVENTION

1. Field of the Invention

The present invention relates to an attachment structure for a trim and a glass run. The trim is attached to a flange formed on the inner circumference of a window frame of a vehicle, and the glass run is attached to a door sash of the window frame so that the glass run guides a door glass to make the door glass slide on the glass run when the door glass is opened and closed in a window opening of the window frame. The present application is based on Japanese Patent Application No. 2000-43189, which is incorporated herein by reference.

2. Description of the Related Art

In the background art, a window frame of a side door of a vehicle is constituted by an inner panel, an outer panel and a door sash which are formed by press forming. To connect these members, flanges formed on the respective members are welded with each other. It is necessary to cover those flanges with a trim having a U-shaped section. A glass run to be attached into an attachment groove of the door sash is of an integral type in which the sectionally u-shaped trim is formed integrally, and others are of a separate type in which the glass run and the trim are formed separately.

Figure 11:
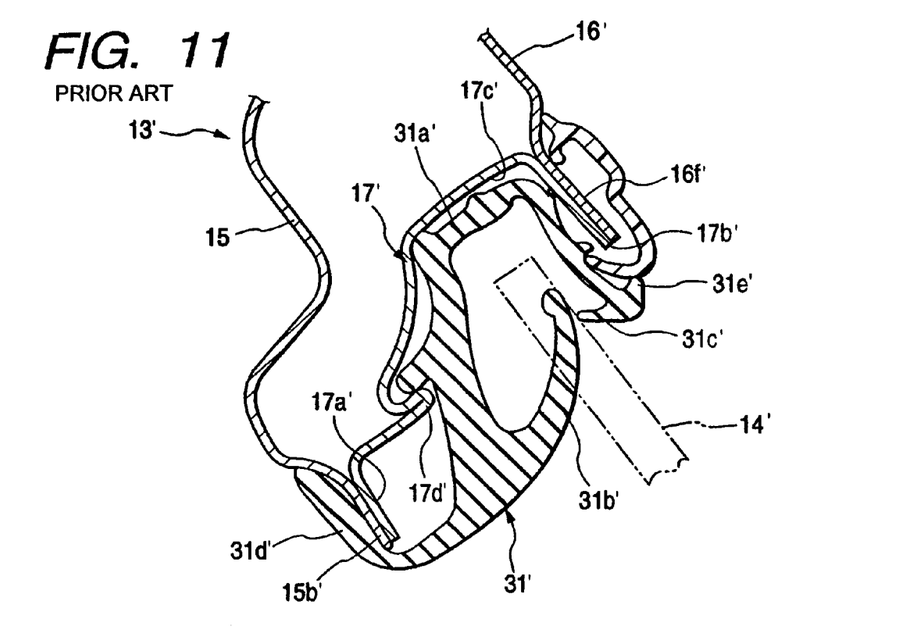
FIG. 11 is a cross-sectional view showing a background-art glass run attachment structure.

In the case of the former, that is, in the case of the integral type, as shown in FIG. 11, a window frame 13' is constituted by an inner panel 15', an outer panel 16', and a door sash 17' attached between the inner panel 15' and the outer panel 16'. A car-interior-side (hereinafter, simply referred to as "interior") flange 17a' of the door sash 17' is welded with an inner-peripheral flange 15b' of the inner panel 15' in a condition that they are superimposed on each other. A car-exterior-side (hereinafter, simply referred to as "exterior") flange 17b' of the door sash 17' is welded with a flange 16f' of the outer panel 16' in a condition that they are superimposed on each other. A glass run body 31a' of a glass run 31' is attached into a channel-like attachment groove 17c', which is formed in the door sash 17' by press forming. A door glass 14' is inserted between seal lips 31b' and 31c' of the glass run body 31a' so that the door glass 14' can be guided by sliding on the glass run body 31a'. A trim 31d' having a U-shaped section is formed integrally with the glass run 31' so as to cover the interior flanges 15b' and 17a'. In addition, a holding lip 31e' also having a seal function is formed on the exterior side wall of the glass run body 31a' so as to perform sealing between the glass run body 31a' and a molding provided separately so as to cover the outside of the flange 16f' of the outer panel 16' (see Japanese Patent Publication No. JP-A-10-86668).

Figure 12:
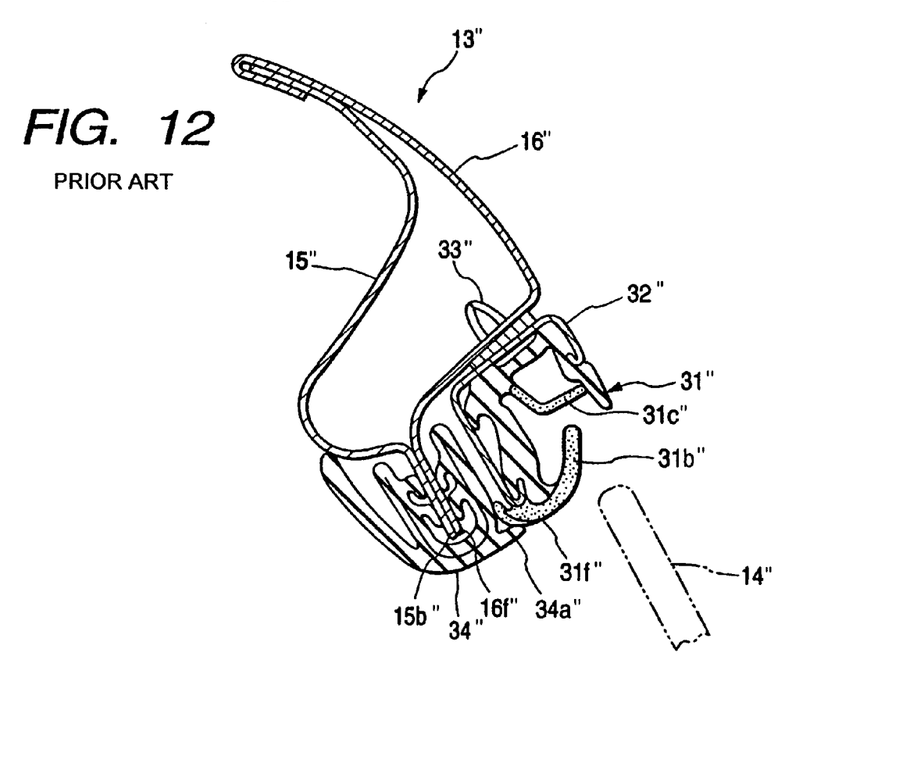
FIG. 12 is a cross-sectional view showing a background-art trim and glass run attachment structure.

On the other hand, in the case of the latter, that is, in the case of the separate type, as shown in FIG. 12, a window frame 13" is constituted by an inner panel 15" and an outer panel 16". A separate retainer frame 32" (corresponding to the door sash 17") also serving as a molding is attached to the outer panel 16" by a clip 33". Then, a glass run 31" is attached into the retainer frame 32". Meanwhile, a trim 34" formed separately from the glass run 31" and having a U-shaped section is attached to interior flanges 15b" and 16f" of the inner panel 15" and the outer panel 16" (see Japanese Utility model Publication No. JP-U-4-130514).

Since the trim 31d' is formed integrally with the glass run body 31a' in the former attachment structure for the glass run 31', the number of parts can be reduced. However, the glass run 31' increases in size as a whole so that there is a problem in the working of attachment to the window frame 13'. In addition, the interior flanges 15b' and 17a' of the inner panel 15' and the door sash 17' respectively perform sealing between the window frame 13' and a door weather strip provided at a door opening edge of a vehicle body frame, at the inner peripheral edge of a corner portion of the window frame 13'. Accordingly, it is necessary to set the curvature radius of each of the flanges 15b' and 17a' to be large in accordance with the large curvature radius of a corner portion of the weather strip. On the contrary, each of the inner peripheral edges of corner portions of the outer panel 16' and the door sash 17' is set to have a small curvature radius in order to improve the external appearance. Incidentally, the above configuration will be made clear in FIG. 2, which shows an embodiment of the present invention.

From the point of view of realization in sheet metal working, however, it is difficult to set the curvature radius of the corner portion at the door opening edge of the vehicle body frame to be small in accordance with the curvature radius of the corner portion of the door sash 17'.

Accordingly, the glass run body 31a' of the glass run 31' and the trim 31d' have different shapes in their corner portions so that each of molded portions of the corner portions has a complicated curved-surface structure and increases in size. Thus, there is a problem that it is difficult to form them by a molding method.

In addition, it is necessary to form the interior seal lip 31b' to be large due to the integral formation of the trim 31d' as shown in FIG. 11. Accordingly, it is difficult to balance the durability of the seal lip 31b' with the sliding resistance when the door glass 14' moves up and down.

Further, there is also a problem that the attachment of the glass run 31' to the window frame 13' is difficult in a corner portion so that it is difficult to set the glass run 31' in a proper position.

On the other hand, in the latter separate-type attachment structure for the glass run 31" and the trim 34", the glass run 31" and the trim 34" are formed by separate members from each other. Accordingly, it is possible to form the glass run 31" to be small as a whole, and it is also possible to mold a corner portion of the glass run 31" easily. In addition, a corner portion of the trim 34" can be formed only by bending an extrusion body formed by an extruding method.

In the latter attachment structure, however, the separate retainer frame 32" is attached to the outer panel 16". Accordingly, the retainer frame 32" may shift in position due to an error in manufacturing and installing the outer panel 16" and the retainer frame 32". As a result, there arises scattering in the pressing force on a contact portion between the interior holding lip 31f" of the glass run 31" and the holding lip 34a" of the trim 34". Then, a shortage of the pressing force causes a failure in sealing, and a gap is formed so that the exterior appearance deteriorates. On the contrary, if the pressing force becomes excessive, the seal lip 31b" of the glass run 31" is displaced on the car-exterior-side. As a result, the seal lip 31b" is intensely pressed on the door glass 14" so that the sliding resistance increases when the door glass 14" moves up and down. Thus, there is a problem that the door glass 14" cannot be moved up and down smoothly.

SUMMARY OF THE INVENTION

It is an object of the present invention to solve the foregoing problems belonging to the background art, and to provide a trim and glass run attachment structure in a vehicle door in which a trim and a glass run can be formed easily, and the glass run is prevented from shifting in position when it is attached to a window frame, so that a door glass can be moved up and down smoothly, and further in which the exterior appearance can be made good-looking.

In order to solve the above problems, there is provided a trim and glass run attachment structure in a vehicle door, comprising: flanges formed on a window frame of a vehicle door; a channel-like attachment groove provided outward to an outer peripheral side from the flanges; wherein a trim having a substantially U-shaped section is attached to the flanges; wherein a glass run body of a glass run formed separately from the trim is fitted into the attachment groove; wherein a part of the trim is in contact with the glass run, when the trim is attached to the flanges; and wherein a part of the flanges and a part of the channel-like attachment groove are integrally formed in a common component.

According to the invention, in the trim and glass run attachment structure in a vehicle door, a car-exterior-side wall surface of the trim is in contact with a car-interior-side wall surface of the glass run.

According to the invention, in the trim and glass run attachment structure in a vehicle door, locking means is provided in each of the attachment groove and the glass run body; the locking means is constituted by lock protrusion strips formed on car-interior-side and car-exterior-side opposite side walls of the attachment groove, and other lock protrusion strips formed integrally with an outside surface of a base portion or outside surfaces of car-interior-side and car-exterior-side opposite side walls of the glass run body so as to be locked by the first-mentioned lock protrusion strips; and in a condition that a part of the trim is brought into contact with the glass run, while the locking means is covered with the part of the trim which is brought into contact with the glass run.

According to the invention, in the trim and glass run attachment structure in a vehicle door, a holding lip is formed integrally with a car-exterior-side side wall of the trim, and another holding lip is provided at an inner peripheral edge of a car-interior-side side wall of the glass run so as to be restricted in position by pressure contact against an outside surface of the holding lip.

According to the invention, a holding lip projecting generally toward the car interior is formed integrally with a car-interior-side side wall of the glass run body, and another holding lip is formed integrally with a car-exterior-side side wall of a trim body of the trim so as to be brought into pressure contact with an outer surface of the car-interior-side holding lip.

According to the invention, in the trim and glass run attachment structure in a vehicle door, an engagement step portion is formed in a car-interior-side side wall of the glass run body, and an outer peripheral edge of a car-exterior-side side wall of a trim body of the trim is engaged with the engagement step portion to be thereby restricted in position.

According to the invention, the holding lip of the glass run and the holding lip of the trim have engaging means which are engaged with each other.

According to the invention, in the trim and glass run attachment structure in a vehicle door, the window frame is constituted by an inner panel, and an outer panel or a molding member, and a door sash so that the flanges are formed in car-interior-side connection portions of the inner panel and the door sash, while the channel-like attachment groove is formed on an outer peripheral side from root portions of the flanges.

According to the invention, in the trim and glass run attachment structure in a vehicle door, the flange of the door sash is formed in series with a car-interior-side side wall of the attachment groove of the door sash, and trim and glass run attachment bases are formed of one and the same members.

DETAILED DESCRIPTION OF THE PREFERRED EMBODIMENTS

An embodiment for carrying out the present invention will be described below with reference to FIGS. 1 to 4.

Figure 4:
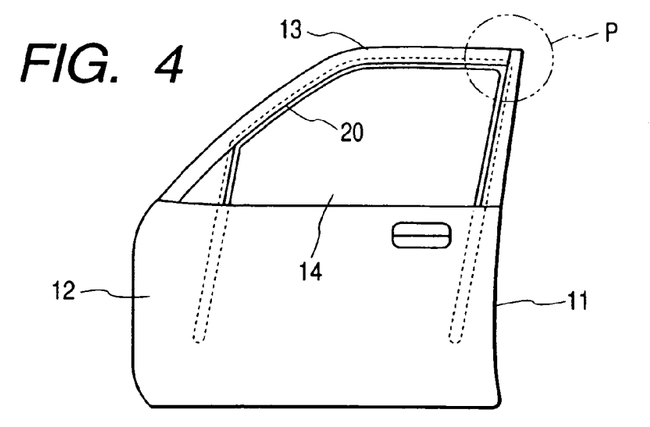
FIG. 4 is a front view of a vehicle side door.

As shown in FIG. 4, a side door 11 of a vehicle is constituted by a door body 12, a window frame 13 provided over the door body 12, and a door glass 14 provided up and down movably.

Figure 1:
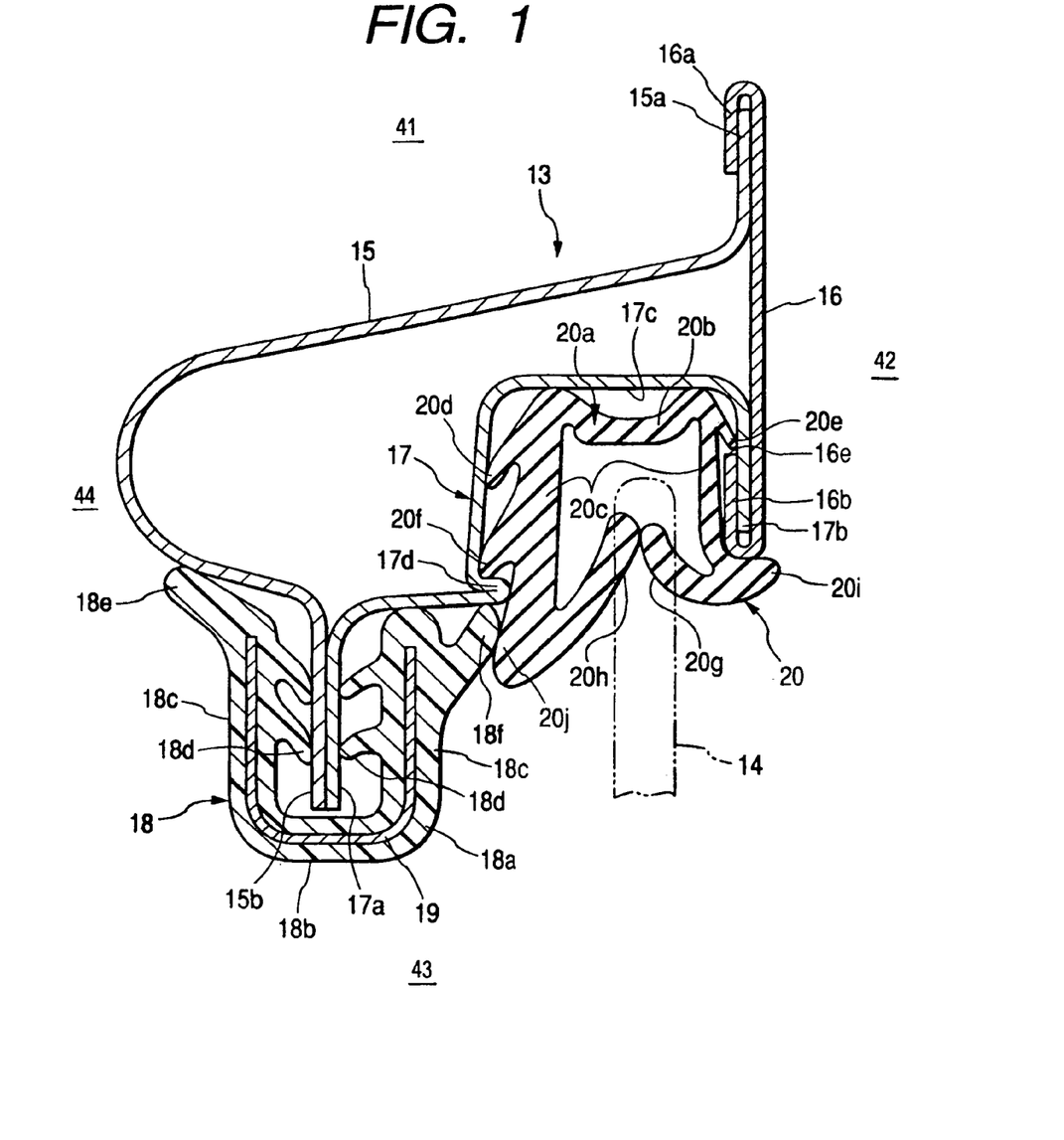
FIG. 1 is a cross-sectional view showing a trim and glass run attachment structure for carrying out the present invention.
Figure 2:
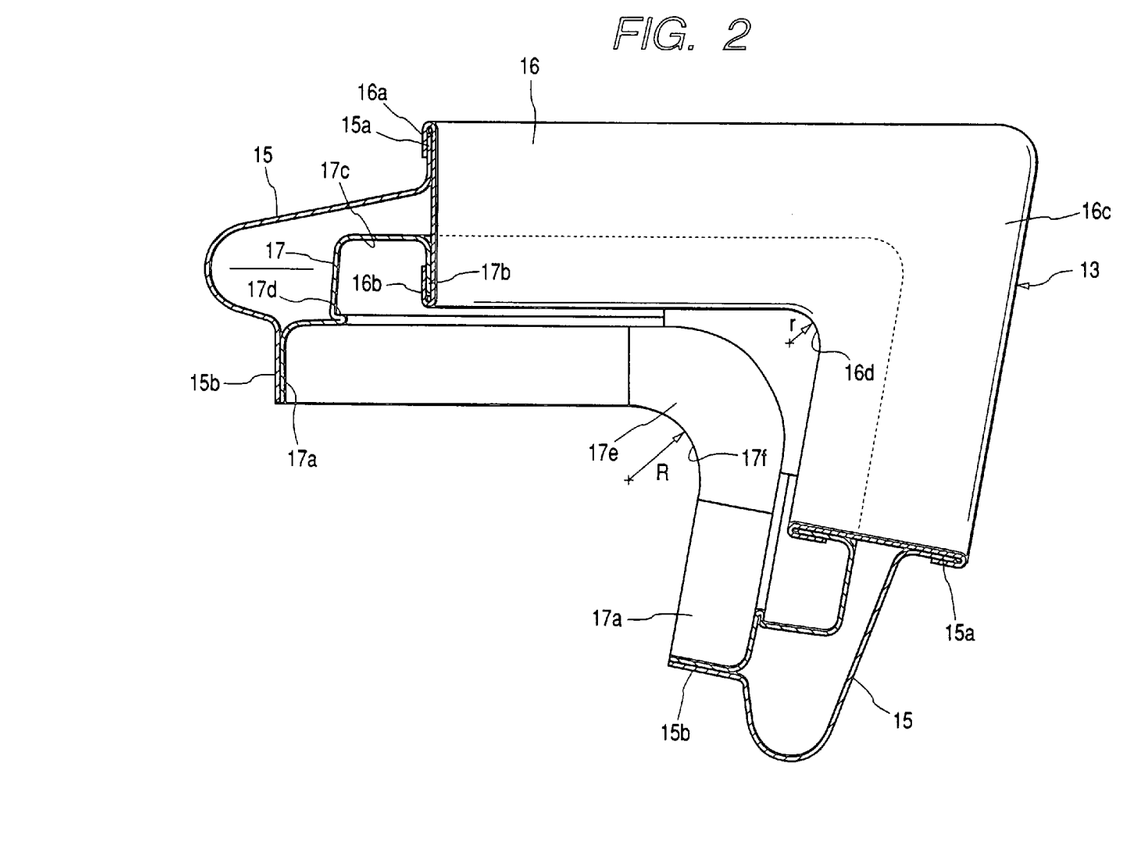
FIG. 2 is an enlarged perspective view of a corner portion of a window frame.

Reference numerals 41, 42, 43, and 44 indicate relative positions around the structure of FIG. 1. That is, an outer peripheral side 41, an inner peripheral side 43, a door interior side 44, and a door exterior side 42 of the structure are marked accordingly in FIG. 1. As shown in FIGS. 1 and 2, the window frame 13 is constituted by an inner panel 15, an outer panel 16 and a door sash 17 which are made of metal. An exterior flange 15*a* of the inner panel 15 is welded with an outer-peripheral bent portion 16*a* of the outer panel 16 in a condition that the inner panel 15 is fitted in the bent portion 16*a*. An interior flange 15*b* of the inner panel 15 is welded with an interior flange 17*a* of the door sash 17 in a condition that the flange 15*b* is put on the flange 17*a* and is brought into contact with the flange 17*a*. The two flanges 15*b* and 17*a* form a flange part. Further, an exterior flange 17*b* of the door sash 17 is welded with an inner-peripheral bent portion 16*b* of the outer panel 16 in a condition that the flange 17*b* is fitted into the bent portion 16*b*.

A trim 18 is attached to the car-interior flanges 15*b* and 17*a*. The material of the trim 18 may be PVC (polyvinyl chloride) resin, TPO (thermoplastic olefin elastomer), or the like, by way of example. A trim body 18*a* of the trim 18 is formed to have a U-shaped cross-section with a base portion 18*b* and a pair of interior and exterior side walls 18*c* and 18*c*, and has a metal insert 19 internally. A plurality (four in this embodiment) of engagement lips 18*d* are formed on the inside surfaces of the side walls 18c and 18c so as to be brought into pressure contact with the interior flanges 15b and 17a. An interior holding lip 18e is formed on an end portion of the interior side wall 18c so as to be brought into pressure contact with the surface of the inner panel 15. An exterior holding lip 18f is formed on the outside wall of the exterior side wall 18c so that the tip edge of the holding lip 18f is brought into pressure contact with the door sash 17.

The trim 18 is attached so that the interior flanges 15b and 17a are inserted into the U-shaped trim body 18a of the trim 18. Then, the engagement lips 18d come into pressure contact with the interior flanges 15b and 17a so as to engage them. Thus, the trim 18 is held in a predetermined attachment position.

As shown in FIG. 1, the glass run 20, which guides the door glass 14 to slide thereon and move up and down while sealing off the interior and exterior sides of the cabin from each other, is attached and locked into a channel-like attachment groove 17c formed in the door sash 17. The attachment groove 17c is located on the outer peripheral side of the root portion of the interior flange 17a, and formed in series with the flange 17a. Namely, the interior flange and the attachment groove 17c are integrally formed in a common component and the relative positions of these two parts are kept stable. The glass run 20 is formed of solid rubber of EPDM (ethylene-propylene-diene copolymer).

Figure 3:
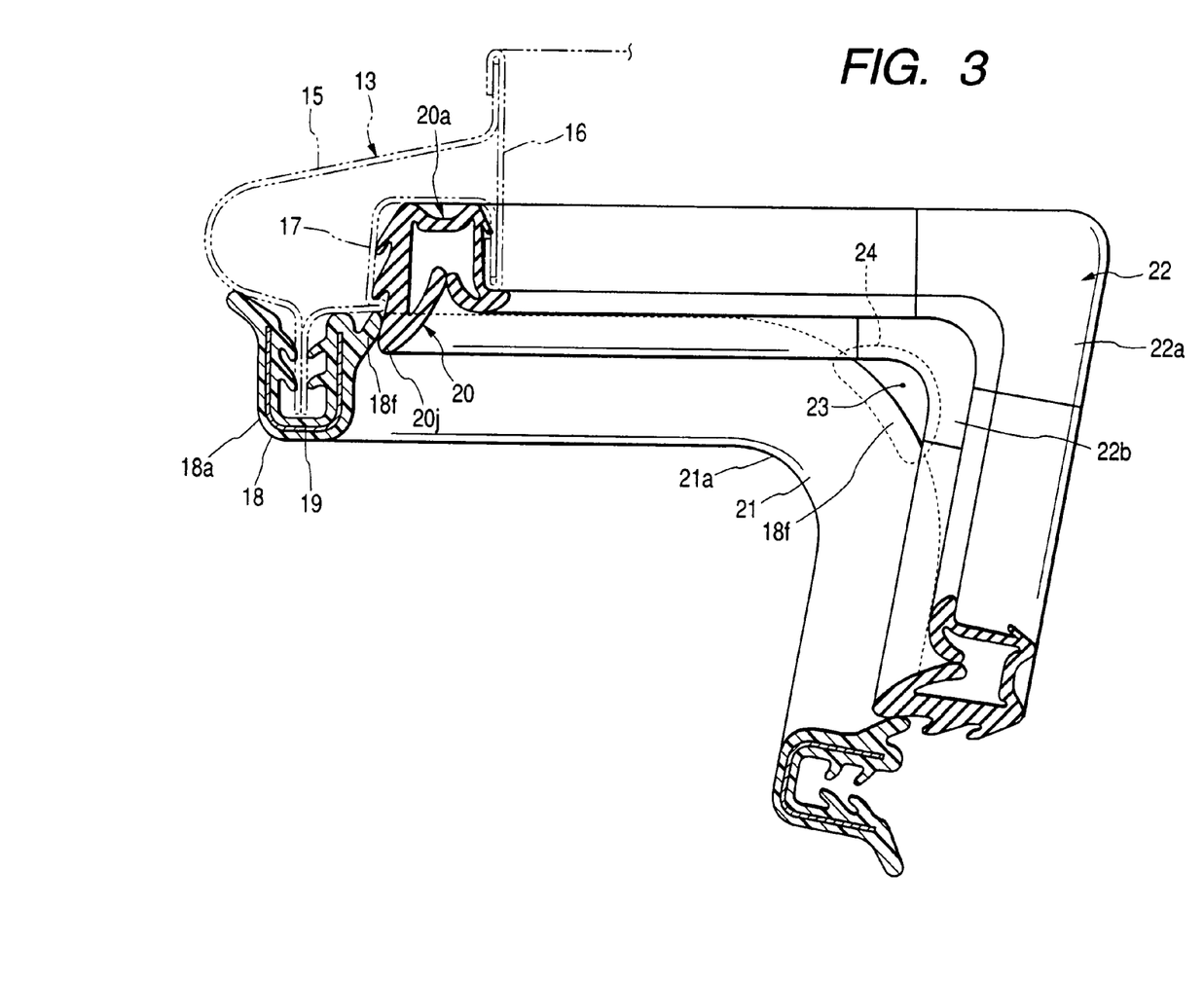
FIG. 3 is an enlarged perspective view of corner portions of a trim and a glass run.

As shown in FIGS. 1 and 3, the glass run 20 is provided with a glass run body 20a having an inverted-U-shape in cross-section. The glass run body 20a is constituted by a base portion 20b and a pair of interior and exterior side walls 20c and 20c projecting from the opposite, left and right side edge portions of the base portion 20b. Lock protrusion strips 20d and 20e constituting lock means are formed on the outer wall surfaces of the opposite end portions of the base portion 20b so as to project thereon. On the other hand, a lock protrusion strip 20f constituting lock means is formed on the outside surface of the interior side wall 20c so as to project thereon. When the glass run body 20a is attached into the attachment groove 17c, the lock protrusion strip 20e is locked by a lock step portion 16e formed by the inner edge of the bent portion 16b on the inner peripheral side of the outer panel 16. Thus, the glass run body 20a is prevented from being detached. The lock protrusion strip 20f is locked by a lock protrusion strip 17d formed like a step at the inner peripheral edge of the interior side wall of the attachment groove 17c of the door sash 17 so as to constitute lock means. Thus, the glass run body 20a is prevented from being detached.

Incidentally, though not shown in the drawings, before the glass run body 20a is attached into the attachment groove 17c, the opposite side walls 20c and 20c of the glass run body 20a are more spread from each other as the positions come at the inner peripheral edges thereof. Therefore, when the glass run 20 is attached into the attachment groove 17c, the side walls 20c and 20c are urged toward the opposite inside surfaces of the attachment groove 17c by the elastic restoring force of the glass run 20. Consequently, the state where the glass run 20 is locked in the attachment groove 17c by the aforementioned lock means is kept stable.

Seal lips 20g and 20h for guiding the door glass 14 to slide thereon in the moving up and down direction are formed integrally with the forward end portions of the opposite side walls 20c and 20c. In addition, an exterior holding lip 20i is formed integrally with the forward end portion of the exterior sidewall 20c. The exterior holding lip 20i is pressed and locked at the edge of the bent portion 16b of the outer panel 16 so as to perform sealing between the outer panel 16 and the glass run 20.

On the other hand, an interior holding lip 20j is formed integrally with the end portion of the interior side wall 20c of the glass run body 20a. The interior holding lip 20j is brought into pressure contact with the outside surface of the holding lip 18f of the trim 18 so as to cover the aforementioned locking means (lock between the lock protrusion strip 20f and the lock protrusion strip 17d) while sealing off the contact portion between the trim 18 and the glass run 20. Thus, the attachment position of the trim 18 and the glass run 20 is restricted.

FIG. 2 shows an enlarged rear corner portion P of the window frame 13 in FIG. 4. As shown in FIG. 2, a corner portion 17e of the interior flanges 15b and 17a is formed so that an inner peripheral edge 17f of the corner portion 17e has a large curvature radius R corresponding to the curvature radius of a corner portion of a car-body-side frame where a door opening is formed. On the other hand, an inner peripheral edge 16d of a corner portion 16c of the outer panel 16 and the door sash 17 is formed to have an acute angle so that a curvature radius $r$ of the inner peripheral edge 16d is smaller than the curvature radius R to thereby make the good-looking appearance.

FIG. 3 is a perspective view showing the trim 18 and the glass run 20 in the corner portion P in FIG. 4. As shown in FIG. 3, a horizontally extending linear portion and a vertically extending linear portion of the trim 18 are connected by a corner portion 21. This corner portion 21 is formed at the same time as the linear portions of the trim 18 are extruded. The curvature radius of an inner peripheral surface 21a of the corner portion 21 is set to be substantially equal to the curvature radius R of the inner peripheral edge 17f of the aforementioned corner portion 17e.

A horizontally extending linear portion and a vertically extending linear portion of the glass run 20 are formed by extrusion. Both the linear portions are connected by a corner molded portion 22. The molded portion 22 is constituted by a first molded portion 22a and a second molded portion 22b. The first molded portion 22a is formed to have substantially the same sectional shape as that of the glass run body 20a. The second molded portion 22b is formed such that the seal lip 20h and the interior holding lip 20j are formed to be large.

As shown in FIG. 3, an opening portion 23 is formed between the outer peripheral surface of the corner portion 21 and the second molded portion 22b in accordance with the difference in size between the aforementioned curvature radii R and r. This opening portion 23 is closed by a shielding plate 24 bonded with the exterior holding lip 18f of the trim 18 in a post-process.

Next, the effects of the side door 11 configured thus will be described together with its configuration.

(1) In the above embodiment, the glass run body 20a of the glass run 20 formed separately from the trim 18 is attached directly into the attachment groove 17c of the door sash 17 constituting the window frame 13 so that the lock protrusion strip 20e is locked by the lock step portion 16e while the lock protrusion strip 20f is locked by the lock protrusion strip 17d. Accordingly, the glass run 20 can be formed to be compact, and the working of attachment thereof can be achieved easily. In addition, the attachment position of the glass run 20 is set to be proper in the attachment groove 17c of the door sash 17 so that the door glass 14 can be guided to slide properly on the glass run 20 by the seal lips 20g and 20h. This is because the flange 17a of the door sash 17 and the interior side wall of the attachment groove 17*c* are formed in series and the attachment bases for the trim 18 and the glass 20 are formed of the same members. In addition, there is no fear that the interior seal lip 20*h* is enlarged according to the relationship between the glass run 20 and the trim 18. Thus, the durability of the interior seal lip 20*h* can be improved.

(2) In the above embodiment, the trim 18 formed separately from the glass run 20 is attached to the interior flange 15*b* of the inner panel 15 and the interior flange 17*a* of the door sash 17. In addition, the exterior holding lip 18*f* is formed on the exterior wall surface of the side wall 18*c* of the trim 18, and the interior holding lip 20*j* of the glass run 20 is brought into pressure contact with the holding lip 18*f*. As a result, dimensional errors on the manufacturing and installing of the door sash 17, the trim 18 and the glass run 20 are absorbed so that the trim 18 and the glass run 20 can be installed properly in desired positions with the door sash 17 as attachment base. Thus, the appearance can be made good-looking.

(3) In the above embodiment, the exterior holding lip 18*f* of the trim 18 is locked by the lock protrusion strip 17*d* of the door sash 17 and the interior holding lip 20*j* of the glass run 20 is pressed onto the holding lip 18*f*. Accordingly, the exterior holding lip 18*f*, the lock protrusion strip 20*f* and the interior holding lip 20*j* can be held to be installed in proper positions with the lock protrusion strip 17*d* as an attachment base. Thus, it can be prevented that the interior holding lip 20*j* is excessively pressed against the exterior side by the exterior holding lip 18*f* so that the seal lip 20*h* is intensely pressed onto the door glass 14. Consequently, the door glass 14 is guided properly to slide in the glass run 20.

(4) In the above embodiment, because the trim 18 and the glass run 20 are formed separately, the curvature radius of the corner portion 21 of the trim 18 can be set to be large correspondingly to the curvature radius R of the corner portion 17*e* of the interior flanges 15*b* and 17*a* as shown in FIG. 2. As a result, the corner portion 21 can be formed not by molding but by extruding together with the trim 18. It is therefore possible to manufacture the corner portion 21 easily. In addition, the corner molded portion 22 of the glass run 20 can be molded to be compact without any consideration of the shape of the corner portion of the trim 18. Accordingly, it is possible to form the corner molded portion 22 easily.

(5) In the above embodiment, step-cut forming is performed so that the corner molded portion 22 of the glass run 20 is constituted by the first molded portion 22*a* and the second molded portion 22*b*. Accordingly, the volume of the corner molded portion 22 can be reduced to make forming equipment therefor compact, and the working of molding can be achieved easily.

Incidentally, the above embodiment can be carried out in the following modifications.

Figure 5:
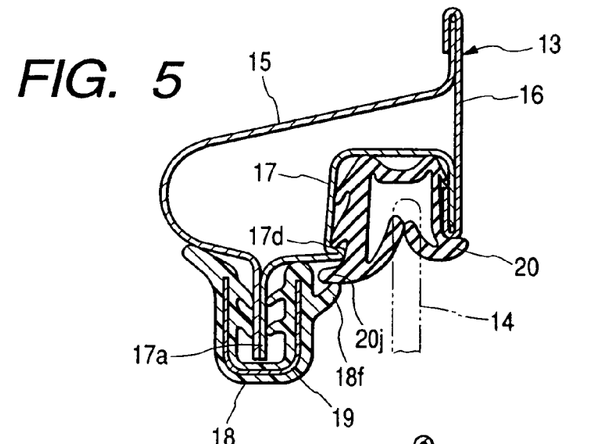
FIG. 5 is a cross-sectional view of a window frame showing another embodiment of the present invention.

As shown in FIG. 5, the exterior holding lip 18*f* of the trim 18 may be brought into pressure contact with the outside surface of the interior holding lip 20*j* of the glass run 20.

In this case, the interior holding lip 20*j* is pressed against the lock protrusion strip 17*d* so that the attachment state of the glass run 20 can be kept stable. In addition, there is no fear that the seal lip 20*h* is pressed against the exterior side. Accordingly, the door glass 14 can be guided properly to slide.

Figure 6:
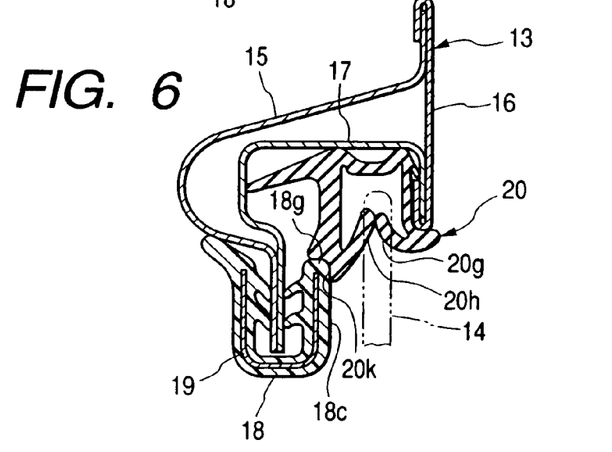
FIG. 6 is a cross-sectional view of a window frame showing another embodiment of the present invention.

As shown in FIG. 6, an engagement step portion 20*k* may be formed in the interior side wall 20*c* of the glass run 20 so that an outer peripheral edge 18*g* of the exterior side wall 18*c* of the trim 18 is engaged with the engagement step portion 20*k*. The engagement step portion 20*k* and the outer peripheral edge 18*g* also have a function as locking means for the glass run 20. In this modification, the lock protrusion strip 17*d* of the door sash 17 may be omitted so that the door sash 17 can be made simple in sectional shape to facilitate the manufacturing.

Figure 7:
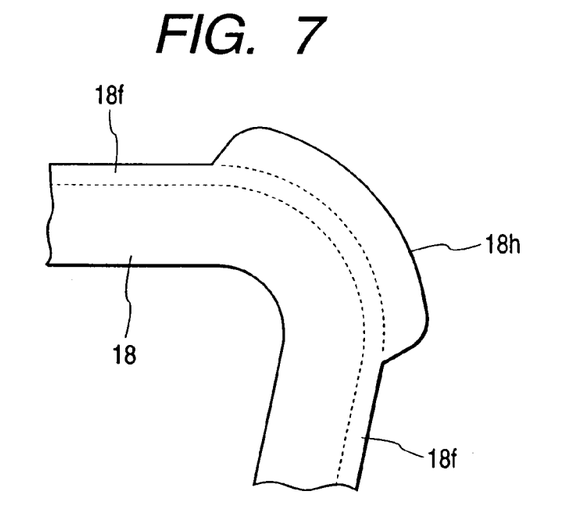
FIG. 7 is a front view of a corner portion of a trim showing another embodiment of the present invention.

As shown in FIG. 7, a shielding plate portion 18*h* may be formed on the corner portion of the exterior holding lip 18*f* of the trim 18 by variable extrusion forming when the trim 18 is extrusion. In this modification, the structure for shielding the opening portion 23 can be formed more easily than that in the case where the shielding plate 24 is bonded with the holding lip 18*f* in a post-process.

Figure 8:
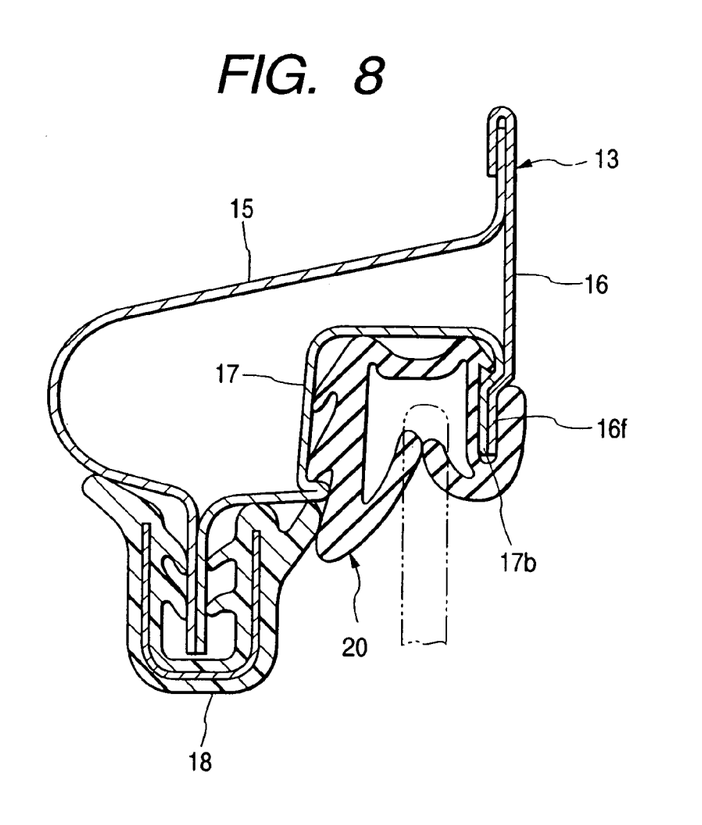
FIG. 8 is a cross-sectional view of a window frame showing another embodiment of the present invention.

As shown in FIG. 8, the bent portion 16*b* on the inner peripheral side of the outer panel 16 may be replaced by a plate-like flange 16*f*. Then, the flange 16*f* is welded in a condition that the flange 16*f* is in contact with the exterior flange 17*b* so that the exterior holding lip 20*i* of the glass run 20 is brought into pressure contact with the flange 16*f*. In this modification, there is formed no gap even if the exterior holding lip 20*i* is attached in a condition that the lip 20*i* is somewhat shifted in position relatively to the flange 16*f*. Accordingly, the appearance can be made good-looking.

Figure 9:
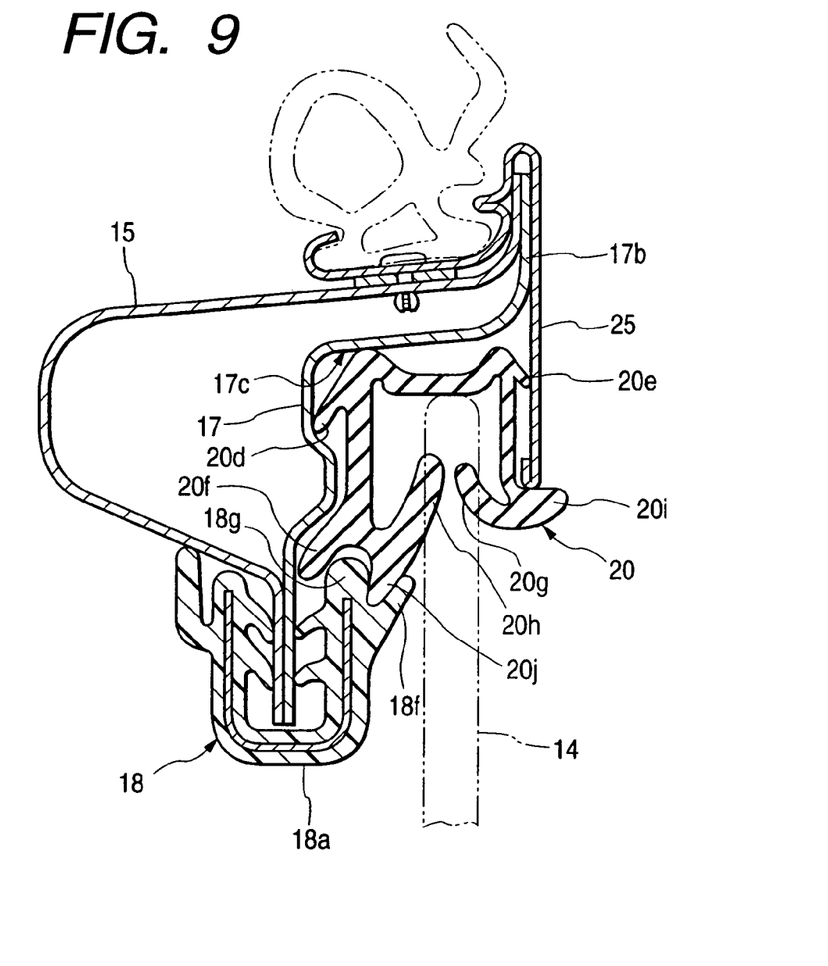
FIG. 9 is a cross-sectional view of a window frame showing another embodiment of the present invention.

As shown in FIG. 9, the outer panel 16 may be replaced by a design molding 25 constituted by a metal panel made of stainless steel or the like. The design molding 25 is fixed to the inner panel 15 so as to cover the exterior flange 17*b*. The glass run 20 is attached into a cross-sectionally U-shaped attachment groove formed by the design molding 25 and the door sash 17 so that the edge of the design molding 25 is pressed by the exterior holding lip 20*i* of the glass run 20. The holding lip 18*f* is brought into contact with the outside surface of the holding lip 20*j* so that the outer peripheral edge 18*e* of the trim body 18*a* is fitted into a groove portion formed between the lock protrusion strip 20*f* and the holding lip 20*j*. In this modification, the connection of the trim 18 and the glass run 20 can be made more stable.

Figure 10:
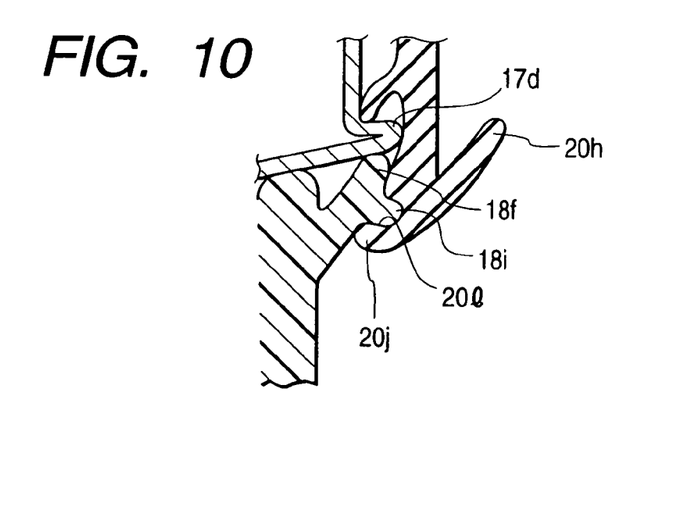
FIG. 10 is a partially cross-sectional view of a trim and a glass run showing another embodiment of the present invention.

As shown in FIG. 10, an engagement protrusion strip 18*i* provided on the exterior holding lip 18*f* may be engaged with an engagement groove 20*l* provided in the interior holding lip 20*j*. Alternatively, the structure of the engagement protrusion strip 18*i* and the structure of the engagement groove 20*l* may be reversed, or they may be formed into lock step portions to be locked by each other. In this modification, the exterior holding lip 18*f* and the interior holding lip 20*j* are prevented from being shifted in position, so that the attachment state can be kept stable.

In place of the outer panel 16, a molding member made of stainless steel may be used to form a window frame.

Description will be made below about technical ideas, other than the claims, which will be grasped from the above embodiment.

(Technical Idea 1) In the invention, a trim and glass run attachment structure in a vehicle door in which the corner portion of the trim 18 is formed by the corner portion 21 and the corner portion of the glass run 20 is formed by the corner molded portion 22.

(Technical Idea 2) In Technical Idea 1, a trim and glass run attachment structure in a vehicle door in which the shielding plate 24 or the shielding plate portion 18*h* for shielding the opening portion 23 formed by the corner portion 21 and the corner molded portion 22 is bonded with or formed integrally with the corner portion 21. In Technical Ideal 2, since the opening portion is shielded, the appearance can be made good-looking.

As described above in detail, according to the invention, scattering in attachment positions of a trim and a glass run is eliminated so that the trim and the glass run can be held in proper positions on a window frame. Thus, the appearance can be made good-looking, and a door glass can be guided to slide properly.

According to the invention, the trim and the glass abut against each other so that they can be positioned properly.

According to the invention, the appearance can be improved, and the locked state of the glass run can be kept stable.

According to the invention, the attachment state of the trim can be kept stable by a holding lip of the glass run.

According to the invention, a holding lip projecting on the interior side of the glass run is pressed by a holding lip on the exterior side of the trim so that seal lips provided on the glass run can be held in proper positions. Thus, the door glass can be guided to slide properly.

According to the invention, the glass run is prevented from being detached from an attachment groove by the trim. As a result, the sectional shape of the door sash is made simple so that press-forming of the door sash can be performed easily.

According to the invention, the exterior holding lip of the trim and the interior holding lip of the glass run can be kept stable in proper positions.

The invention claimed is:

1. A trim and glass run attachment structure in a vehicle door comprising:
    a flange part provided on a window frame of the vehicle door, wherein said window frame is comprised by an inner panel, an outer panel and a door sash, and the flange part is comprised by a portion of the window frame at which an interior flange of the inner panel and an interior flange of the door sash are joined together;
    a U-shaped attachment groove, which is adjacent to and integral with a proximal end of the flange part, wherein the proximal end of the flange part is closer to the inner panel than a distal end of the flange part, and wherein the U-shaped attachment groove is on an exterior side of the proximal end of said flange part and is on an outer peripheral side of the proximal end of said flange part;
    a lock protrusion strip provided on a wall of said attachment groove that is on an interior side of said attachment groove, and said lock protrusion strip is adjacent the proximal end of said flange part;
    a trim, which has a substantially U-shaped cross-section and is attached to said flange part; and
    a glass run, which is separate from said trim, wherein:
        the glass run has a glass run body attached to said attachment groove;
        the glass run body includes opposing side walls and a pair of seal lips, one seal lip of the pair of seal lips engaging the interior side of a window glass and the other seal lip of the pair of seal lips engaging the exterior side of the window glass;
        said glass run body has a lock protrusion strip engaging with the lock protrusion strip of the attachment groove to retain the glass run body in said groove;
    a part of said trim is in contact with said glass run, when said trim is attached to said flange part, an exterior part of said flange part and an interior part of said attachment groove are integrally formed as a single component, and the single component fixes the positions of the trim and the glass run to keep the trim in contact with the glass run;
        the flange part and the attachment groove are formed in series and are partitioned by the lock protrusion strip of the attachment groove;
        the glass run has a U-shaped structure in cross section;
        the trim is an extrusion that is bent to fit a corner of the window frame;
        the glass run includes a molded corner part that corresponds to the corner; and
        an opening is formed between the trim and the glass run in the corner due to a difference in a radius of curvature between the trim and the glass run in the corner, and the opening is covered with a shielding plate located outside of a side wall of the trim.

2. A trim and glass run attachment structure in a vehicle door according to claim 1, wherein the part of the trim that is in contact with of the glass run is on an exterior side of the trim.

3. A trim and glass run attachment structure in a vehicle door according to claim 2, wherein an engagement step portion is formed in said wall of said glass run body that is on an interior side of said glass run body, and wherein an outer peripheral edge of said side wall of the trim is engaged with said engagement step portion to hold said glass run body in said position.

4. A trim and glass run attachment structure in a vehicle door according to claim 2, wherein a holding lip is formed integrally on the exterior side of said trim, and another holding lip is provided on an interior side of the glass run so that the trim is held in position by pressure contact by said another holding lip against an outside surface of said holding lip of said trim.

5. A trim and glass run attachment structure in a vehicle door according to claim 4, wherein said another holding lip of said glass run and said holding lip of said trim have an engaging means for engaging the holding lips with each other.

6. A trim and glass run attachment structure in a vehicle door according to claim 2, wherein a holding lip is formed integrally with a said wall of said glass run body that is on an interior side of the glass run body, and wherein another holding lip is formed integrally with said side wall of the trim and is brought into pressure contact with the holding lip on the glass run body.

7. A trim and glass run attachment structure in a vehicle door according to claim 1, wherein said single component comprises said door sash, and wherein said flange part is formed between said inner panel and said door sash.

8. A trim and glass run attachment structure in a vehicle door according to claim 7, wherein said single component forms an attachment base for both the glass run and the trim.

9. A trim and glass run attachment structure in a vehicle door, wherein the attachment structure comprises:
    a window frame that includes an inner panel, an outer panel and a door sash;
    a flange part formed by a portion of the window frame at which an inner flange of the inner panel and an inner flange of the door sash are joined together;
    a U-shaped attachment groove, which is adjacent to and integral with a proximal end of the flange part, wherein the U-shaped attachment groove is on an exterior side of the proximal end of the flange part and is on an outer peripheral side of the proximal end of the flange part, and wherein the inner flange of the door sash and an interior part of the U-shaped attachment groove are included in a single integral component;

a lock protrusion formed in the single integral component wherein the lock protrusion is located on an interior wall of the attachment groove and adjacent the proximal end of the flange part, wherein the flange part and the attachment groove are formed in series and are partitioned by the lock protrusion;

a window corner;

a glass run, wherein the glass run is generally U-shaped in cross-section and includes a glass run body fitted in the attachment groove, wherein the glass run body includes opposing side walls and a pair of seal lips, one seal lip of the pair of seal lips being on the interior side of a window glass and the other seal lip of the pair of seal lips being on the exterior side of the window glass, and wherein the seal lips are structured to engage the sides of the window glass, and wherein the glass run body has a lock protrusion strip engaging with the lock protrusion to retain the glass run body in the attachment groove, wherein the glass run further includes a molded corner part; and a trim, which is separate from the glass run, wherein:
  the trim is attached to the flange part;
  the trim has a generally U-shaped cross section;
  part of the trim is in contact with the glass run when the trim is attached to the flange part;
  the single integral component securely fixes the positions of the trim and the glass run to keep the trim and the glass run in contact with one another and to accurately position the glass run and the trim; and
  the trim includes an extruded corner part that is bent to fit the corner; and
  an opening is formed between the trim and the glass run in the corner due to a difference in a radius of curvature between the trim and the glass run in the corner, and the opening is covered with a shielding plate portion that is formed integrally with the corner part on an outer peripheral side of a side wall of the trim.

10. A trim and glass run attachment structure in a vehicle door according to claim 9, wherein the part of the trim that is in contact with the glass run is on an exterior side of the trim.

11. A trim and glass run attachment structure in a vehicle door according to claim 10, wherein an engagement step portion is formed in said wall of the glass run body that is on an interior side of the glass run body, and wherein an outer peripheral edge of said side wall which is on the exterior side of the trim is engaged with the engagement step portion to hold the glass run body in said position.

12. A trim and glass run attachment structure in a vehicle door according to claim 10, wherein a holding lip is formed integrally with said side wall of the trim, and another holding lip is provided on an inner peripheral edge of the glass run on said wall of the glass run that is on an interior side of the glass run so that the trim is held in said position by pressure contact by said another holding lip against an outside surface of the holding lip.

13. A trim and glass run attachment structure in a vehicle door according to claim 12, wherein the another holding lip of the glass run and the holding lip of the trim have an engaging means for engaging the holding lips with each other.

14. A trim and glass run attachment structure in a vehicle door according to claim 10, wherein a holding lip is formed integrally with said wall of the glass run body that is on an interior side of the glass run, and wherein another holding lip is formed integrally with said wall of the trim that is on the exterior side of the trim and is brought into pressure contact with the holding lip on the glass run body.

15. A trim and glass run attachment structure in a vehicle door according to claim 9, wherein the window frame is constituted by the inner panel, the outer panel, and the door sash, and wherein the flange part is formed between the inner panel and the door sash.

* * * * *